Patented Sept. 18, 1951

UNITED STATES PATENT OFFICE 2,568,634

PREPARATION OF BETA-ACYLOXY CARBOXYLIC ACIDS AND ANHYDRIDES

Jacob Eden Jansen, Akron, Ohio, assignor to The B. F. Goodrich Company, New York, N. Y., a corporation of New York No Drawing. Application February 19, 1949, Serial No. 77,454

10 Claims. (Cl. 260—491)

This invention relates to a method for preparing beta-acyloxy carboxylic acids and novel beta-acyloxy carboxylic anhydrides, and pertains more particularly to the preparation of such compounds by the reaction of beta-lactones with carboxylic acids and with the corresponding anhydrides.

It is disclosed in U. S. Patent 2,356,459 to Frederick E. Küng that beta-lactones, that is lactones or inner esters of beta-hydroxy carboxylic acids may be obtained in good yields by the reaction of a ketene with an aldehyde or ketone. In this manner beta-propiolactone (also called hydracrylic acid lactone), which has the formula

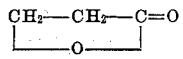

is economically obtained from ketene and formaldehyde.

I have now discovered that beta-propiolactone, and the other saturated aliphatic beta-lactones, will react very readily with a compound selected from the class consisting of carboxylic acids and the corresponding anhydrides in the presence of a mineral acid catalyst to give in excellent yields a compound selected from the class consisting of beta-acyloxy carboxylic acids (obtained when carboxylic acids are utilized in the reaction) and novel beta-acyloxy carboxylic anhydrides (obtained when anhydrides are utilized). The acids and anhydrides (which anhydrides have not been prepared heretofore) obtained by the reaction of this invention, have unusual properties which render them useful in organic syntheses, in the rubber and plastics industries, as biologically and physiologically active agents and for a large number of other purposes.

The reaction of beta-lactones with carboxylic acids and with anhydrides is non-ionic in character and may be represented in general by the following equations:

I

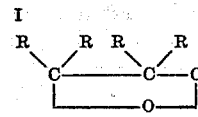

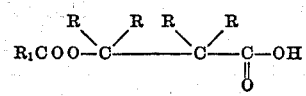

II

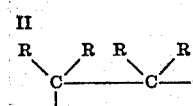

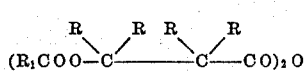

wherein each R is a member of the class consisting of hydrogen and alkyl and $R_1$ is an organic radical.

In carrying out the reaction no special conditions are necessary, the reaction proceeding whenever the reactants are brought into effective contact with one another. For example, when both reactants are liquids, the reaction is preferably effected simply by adding the beta-lactone to a solution of the catalyst in the acid or the anhydride and in the absence of other materials and fractionating the reaction mixture to obtain the pure product. However, these conditions are by no means critical since the desired products are also obtained by reacting beta-lactones with acids or anhydrides in the presence of the catalyst and inert solvents or diluents such as benzene or ether (such a substance being preferred if one or both of the reactants is a solid).

The reactants may be brought together in any desired molar ratio. However, an excess of the acid or anhydride is preferably employed since the tendency for the beta-lactone to polymerize or to react with the reaction product is thereby repressed. Accordingly, a molar ratio of about 2 to 5 moles of the acid or anhydride to 1 mole of the beta-lactone is desirably used.

As disclosed hereinabove, mineral acids catalyze the reaction of the invention. By mineral acid is meant a strong inorganic acid such as sulfuric acid, hydrochloric acid, nitric acid, phosphoric acid and the like, sulfuric acid being especially useful in the present reaction. The catalyst is preferably present in an amount of about .01% to 1% by weight based on the total weight of the reactants although any convenient quantity may be employed.

It has been found that the temperature at which the reaction is conducted is not at all critical and has little or no effect on the yields of product obtained. The reaction tends to be exothermic and, in fact, the temperature rises rapidly for a short time after the reactants are brought together, although the temperatures attained are ordinarily not so high as to necessitate external cooling. Consequently, the reaction is preferably permitted to proceed without the addition of heat or without utilizing external cooling means. However, if desired the reaction may be effected at temperatures as low as −60° C. or even lower and as high as the refluxing temperature of the reactants or even higher temperatures may be employed if super atmospheric pressures are used.

The nature of the acid or anhydride which is reacted with beta-lactones may be varied widely. Thus, any of the various carboxylic acids, including saturated and unsaturated, aliphatic and cyclic, mono- and poly-carboxylic acids such as acetic, propionic, butyric, isobutyric, caprylic, caproic, capric, lauric, palmitic, stearic and other saturated aliphatic monocarboxylic acids; acrylic, crotonic, oleic, lineolic and other unsaturated aliphatic monocarboxylic acids; cyclohexanoic, furoic, benzoic, toluic, cinnamic, and other alicyclic, heterocyclic, and aromatic monocarboxylic acids; oxalic, succinic, adipic, sebacic, aconitic, maleic, phthalic and other polycarboxylic acids, may all be substituted one for another with generally equivalent results; it being of course necessary to take into account that in polycarboxylic acids each of the acid groups will react with the beta-lactone. In addition to carboxylic acids in which the only function is carboxyl (acids made up of hydrocarbon structure and carboxyl groups), carboxylic acids containing substituents such as halogen, nitro, oxy, hydroxy, thio, thiol, cyano, acyl, acyloxy, keto, amino, azo and the like may also be used. When substituent groups which contain a reactive hydrogen atom such as hydroxy, thiol, and amino are present the beta-lactone may also react with the substituent group thereby complicating the reaction; hence the use of carboxylic acids in which all of the hydrogens except those attached to carbon are present in carboxyl groups is preferred.

In like manner, anhydrides of any of the acids listed in the foregoing paragraph will react with beta-lactones in the presence of a mineral acid catalyst to give an anhydride of a beta-acyloxy carboxylic acid. As examples of specific anhydrides which are preferably used there are included acetic anhydride, propionic anhydride, butyric anhydride, benzoic anhydride, maleic anhydride, phthalic anhydride and the like.

Although beta-propiolactone is the preferred beta-lactone because of its low cost and ease of reactivity, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, beta-methyl-beta-valerolactone and the like may also be used to produce other beta-acyloxy carboxylic acids and anhydrides.

It is to be understood, therefore, that this invention contemplates the reaction of any of the class of saturated aliphatic beta-lactones with any of the generic class of carboxylic acids and anhydrides, to produce beta-acyloxy carboxylic acids and anhydrides thereof.

The following examples are intended to illustrate the practice of this invention but are not to be construed as a limitation upon the scope thereof, for there are, of course, numerous possible variations and modifications. In the examples all parts are by weight.

*Example I*

72 parts (1 mole) of beta-propiolactone are added to a stirred solution of 0.1 part of concentrated sulfuric acid in 306 parts (3 moles) of acetic anhydride. The temperature rises to a maximum of 125° C. in a period of 30 minutes. After cooling, the excess acetic anhydride is removed at reduced pressure and the residue is then distilled in an efficient column and at reduced pressure. 105 parts (85%) of beta-acetoxy propionic anhydride are collected at 60° to 62° C. at 0.05 mm. ($N_D^{20}$ 1.4340). A mixture of 1-ethyl beta-acetoxy propionate (B. P. 34–35/0.3 mm.; $N_D^{20}$ 1.4164) and beta-acetoxy propionic acid (B. P. 83° C./0.3 mm.; $N_D^{20}$ 1.4314) prepared by refluxing the beta-acetoxy propionic anhydride with ethyl alcohol gave the following analyses:

Calculated for 1-ethyl beta-acetoxy propionate:

|  | Found |
|---|---|
| Saponification equivalent 80 | 81 |

Calculated for beta-acetoxy propionic acid:

|  | Found |
|---|---|
| Saponification equivalent 66 | 66.2 |
| Neutral equivalent 132 | 134 |

*Example II*

72 parts (1 mole) of beta-propiolactone are added to a stirred solution of 0.1 part concentrated sulfuric acid in 300 parts (5 moles) of glacial acetic acid. The temperature rises to a maximum of 81° C. in 40 minutes. After an additional hour, the excess acetic acid is removed at 20 mm. and 102 parts (78%) of beta-acetoxypropionic acid (B. P. 77 to 78° C./0.05 mm.; $N_D^{20}$ 1.4308) are obtained as the principal fraction.

Analysis:

Calculated for $C_5H_8O_4$:

|  | Found |
|---|---|
| Saponification equivalent 66 | 67.4 |
| Neutral equivalent 132 | 130.5 |

*Example III*

60 parts (1 mole) of acetic acid (glacial, 36 parts (0.5 mole) of beta-propiolactone and .1 part of concentrated sulfuric acid are mixed in a glass reactor. The temperature rises to a maximum of 130° C. in a period of about 30 minutes. The reaction mixture is then fractionated and 43 parts (65%) of beta-acetoxypropionic acid (B. P. 88°–91° C. at .01 mm.; $N_D^{25}$ 1.4209) are obtained. 13.5 parts (20%) of a residue, probably beta-lactone polymer, are also obtained.

*Example IV*

306 parts (3 moles) of acetic anhydride, 72 parts (1 mole) of beta-propiolactone and .05 part of concentrated sulfuric acid are placed in a flask, the temperature of the resulting mixture being maintained at 0° C. during the course of the reaction. When the reaction is complete, the reaction mixture is fractionated and 93.5 (76%) parts of beta-acetoxy propionic anhydride are collected at 61°–63° C. at 0.05 mm. ($N_D^{20}$ 1.4320).

*Example V*

72 parts (1 mole) of beta-propiolactone, 51 parts (½ mole) of acetic anhydride and 0.05 part of concentrated sulfuric acid are reacted as in Example IV. 36.5 parts of beta-acetoxy propionic anhydride (B. P. 56°–57° C. at .01 mm.; $N_D^{20}$ 1.4330) are obtained.

*Example VI*

72 parts (1 mole) of beta-propiolactone are added to a solution of 0.1 part concentrated sulfuric acid in 370 parts (5 moles) of propionic acid. The resulting solution is warmed to 60° C. whereupon a rapid rise in temperature to 100° C. occurs. The reaction mixture is then allowed to cool to room temperature and the excess propionic acid is removed at 10 mm. and the residue distilled in an efficient column maintained at .01 mm. 70 parts (48%) of beta-propionoxy propionic acid (B. P. 79°–82° C. at .01 mm.; $N_D^{25}$ 1.4300) are obtained.

Similarly, when the above examples are repeated utilizing other molar ratios of the reactants or other mineral acid catalysts, beta-acyloxy carboxylic acids and anhydrides are obtained in high yields. Also, when other of the carboxylic acids listed hereinabove are reacted with saturated aliphatic beta-lactones, still other beta-acyloxy carboxylic acids and anhydrides are obtained. For example, when valeric acid is reacted with beta-butyrolactone in the presence of concentrated hydrochloric acid, beta-valeroxy butyric acid is obtained, when caproic anhydride is reacted with alpha-methyl beta-propiolactone in the presence of concentrated nitric acid, beta-caproxy-alpha-methyl propionic anhydride is obtained, and when phthalic anhydride is reacted with beta propiolactone in the presence of sulfuric acid, the anhydride of di-(beta-carboxyethyl) phthalate is obtained.

Numerous other variations and modifications in the procedure described herein will occur to those skilled in the art and are included within the spirit and scope of the invention as defined in the appended claims.

I claim:

1. The method which comprises bringing together in the presence of a mineral acid catalyst a saturated aliphatic beta-lactone and a compound selected from the class consisting of carboxylic acids in which the hydrogen atoms not attached to carbon atoms are present in carboxyl groups, and anhydrides in which all the hydrogen atoms are attached to carbon atoms, thereby to obtain a compound selected from the class consisting of beta-acyloxy carboxylic acids and beta-acyloxy carboxylic anhydrides.

2. The method which comprises bringing together in the presence of a mineral acid catalyst a saturated aliphatic beta-lactone and a carboxylic acid in which the hydrogen atoms not attached to carbon atoms are present in carboxyl groups, thereby to obtain a beta-acyloxy carboxylic acid.

3. The method which comprises bringing together in the presence of a mineral acid catalyst a saturated aliphatic beta-lactone and a carboxylic acid anhydride in which the hydrogen atoms are attached to carbon atoms, thereby to obtain a beta-acyloxy carboxylic anhydride.

4. The method which comprises bringing together in the presence of a mineral acid catalyst beta-propiolactone and a compound selected from the class consisting of carboxylic acids in which the hydrogen atoms not attached to carbon atoms are present in carboxyl groups and anhydrides in which all the hydrogen atoms are attached to carbon atoms and recovering from the reaction mixture a compound selected from the class consisting of beta-acyloxy propionic acids and beta-acyloxy propionic anhydrides.

5. The method which comprises bringing together in the presence of a mineral acid catalyst beta-propiolactone and a monocarboxylic acid in which the hydrogen atoms not attached to carbon atoms are present in carboxyl groups, and recovering from the reaction mixture a beta-acyloxy propionic acid.

6. The method which comprises bringing together in the presence of a mineral acid catalyst beta-propiolactone and an anhydride of a monocarboxylic acid, in which anhydride all the hydrogen atoms are attached to carbon atoms, and recovering from the reaction mixture a beta-acyloxy propionic acid anhydride.

7. The method which comprises bringing together in the presence of concentrated sulfuric acid, beta-propiolactone and acetic acid, and recovering from the reaction mixture beta-acetoxy propionic acid.

8. The method which comprises bringing together in the presence of concentrated sulfuric acid, one mole of beta-propiolactone and from 1 to 5 moles of acetic acid, and fractionating the reaction mixture at reduced pressure to obtain beta-acetoxy propionic acid.

9. The method which comprises bringing together in the presence of concentrated sulfuric acid, beta-propiolactone and acetic anhydride, and recovering from the reaction mixture beta-acetoxy propionic anhydride.

10. The method which comprises bringing together in the presence of concentrated sulfuric acid, one mole of beta-propiolactone and from 1 to 5 moles of acetic anhydride, and fractionating the reaction mixture at reduced pressure to obtain beta-acetoxy propionic anhydride.

JACOB EDEN JANSEN.

REFERENCES CITED

The following references are of record in the file of this patent:

UNITED STATES PATENTS

| Number | Name | Date |
| --- | --- | --- |
| 2,449,990 | Gresham | Sept. 28, 1948 |

FOREIGN PATENTS

| Number | Country | Date |
| --- | --- | --- |
| 549,306 | Great Britain | Nov. 11, 1942 |